United States Patent
Fang et al.

(10) Patent No.: US 9,601,763 B2
(45) Date of Patent: Mar. 21, 2017

(54) PROCESS FOR MASS-PRODUCING SILICON NANOWIRES AND SILICON NANOWIRE-GRAPHENE HYBRID PARTICULATES

(71) Applicants: Qing Fang, Marysville, OH (US); Aruna Zhamu, Springboro, OH (US); Bor Z Jang, Centerville, OH (US)

(72) Inventors: Qing Fang, Marysville, OH (US); Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 74 days.

(21) Appl. No.: 14/545,108

(22) Filed: Mar. 27, 2015

(65) Prior Publication Data

US 2016/0285084 A1    Sep. 29, 2016

(51) Int. Cl.
| | |
|---|---|
| *H01M 4/36* | (2006.01) |
| *H01M 4/04* | (2006.01) |
| *H01M 4/38* | (2006.01) |
| *H01M 4/583* | (2010.01) |

(Continued)

(52) U.S. Cl.
CPC ......... *H01M 4/366* (2013.01); *H01M 4/0402* (2013.01); *H01M 4/0423* (2013.01); *H01M 4/0428* (2013.01); *H01M 4/0471* (2013.01); *H01M 4/386* (2013.01); *H01M 4/583* (2013.01); *H01M 10/052* (2013.01); *H01M 2004/027* (2013.01)

(58) Field of Classification Search
CPC .. H01M 4/134; H01M 4/1395; H01M 4/8605; H01M 4/366; H01M 4/386; H01M 4/0421; H01M 4/0428
See application file for complete search history.

(56) References Cited

U.S. PATENT DOCUMENTS

| | | |
|---|---|---|
| 7,071,258 B1 | 7/2006 | Jang et al. |
| 7,615,206 B2 | 11/2009 | Sandhage et al. |
| 7,745,047 B2 | 6/2010 | Jang et al. |

(Continued)

OTHER PUBLICATIONS

U.S. Appl. No. 10/858,814, filed Jun. 3, 2004, B. Z. Jang, et al.

(Continued)

*Primary Examiner* — Stewart Fraser

(57) ABSTRACT

Disclosed is a process for producing graphene-silicon nanowire hybrid material, comprising: (A) preparing a catalyst metal-coated mixture mass, which includes mixing graphene sheets with micron or sub-micron scaled silicon particles to form a mixture and depositing a nano-scaled catalytic metal onto surfaces of the graphene sheets and/or silicon particles; and (B) exposing the catalyst metal-coated mixture mass to a high temperature environment (preferably from 300° C. to 2,000° C., more preferably from 400° C. to 1,500° C., and most preferably from 500° C. to 1,200° C.) for a period of time sufficient to enable a catalytic metal-catalyzed growth of multiple silicon nanowires using the silicon particles as a feed material to form the graphene-silicon nanowire hybrid material composition. An optional etching or separating procedure may be conducted to remove catalytic metal or graphene from the Si nanowires.

25 Claims, 13 Drawing Sheets

(51) Int. Cl.
*H01M 10/052* (2010.01)
*H01M 4/02* (2006.01)

(56) References Cited

U.S. PATENT DOCUMENTS

| | | | | |
|---|---|---|---|---|
| 2014/0162131 A1* | 6/2014 | Friend | ............... | H01M 4/583 429/231.8 |
| 2015/0093648 A1* | 4/2015 | Son | ............... | H01B 1/04 429/231.8 |
| 2015/0099173 A1* | 4/2015 | Sun | ............... | C22C 38/02 429/218.1 |
| 2015/0236342 A1* | 8/2015 | Rojeski | ............... | H01M 4/366 429/218.1 |

OTHER PUBLICATIONS

U.S. Appl. No. 11/509,424, filed Aug. 25, 2006, B. Z. Jang, et al.

* cited by examiner

PROCESS FOR MASS-PRODUCING SILICON NANOWIRES AND SILICON NANOWIRE-GRAPHENE HYBRID PARTICULATES

FIELD OF THE INVENTION

This invention relates generally to a process for producing silicon nanowires and more particularly to a process for cost-effectively producing silicon nanowire/graphene hybrid compositions for lithium-ion battery anode applications.

BACKGROUND

Lithium ion battery is a prime candidate energy storage device for electric vehicle (EV), renewable energy storage, and smart grid applications. Graphite materials have been widely used as an anode active material for commercial lithium ion batteries due to their relatively low cost and excellent reversibility. However, the theoretical lithium storage capacity of graphite is only 372 mAh/g (based on $LiC_6$), which can limit the total capacity and energy density of a battery cell. The emerging EV and renewable energy industries demand the availability of rechargeable batteries with a significantly higher energy density and power density than what the current Li ion battery technology can provide. Hence, this requirement has triggered considerable research efforts on the development of electrode materials with higher specific capacity, excellent rate capability, and good cycle stability for lithium ion batteries.

Several elements from Group III, IV, and V in the periodic table can form alloys with Li at certain desired voltages. Therefore, various anode materials based on such elements and some metal oxides (e.g., $SnO_2$) have been proposed for lithium ion batteries. Among these, silicon is considered the most promising one since it has the highest theoretical specific capacity (up to 4,200 mAh/g in the stoichiometric form of $Li_{4.4}Si$) and low discharge potential (i.e., high operation potential when paired with a cathode). However, the dramatic volume changes (up to 380%) of Si during lithium ion alloying and de-alloying (cell charge and discharge) often led to severe and rapid battery performance deterioration. The performance fade is mainly due to the volume change-induced pulverization of Si and the inability of the binder/conductive additive to maintain the electrical contact between the pulverized Si particles and the current collector. In addition, the intrinsic low electric conductivity of silicon is another challenge that needs to be addressed. Thus far, many attempts have been made to improve the electrochemical performance of Si-based anode materials, which include (1) reducing particle size to the nano-scale (<100 nm), such as Si nanoparticles, nanowires, or thin film, to reduce the total strain energy, which is a driving force for crack formation in the particle; (2) depositing Si particles on a highly electron-conducting substrate; (3) dispersing Si particles in an active or non-active matrix; and (4) coating Si particles with a layer of carbon. Although some promising anodes with specific capacities in excess of 1,000 mAh/g have been reported, it remains challenging to retain such high capacities over cycling (e.g., for more than 100 cycles) without significant capacity fading.

Our research group discovered graphene, a new class of nano carbon materials, in 2002 [B. Z. Jang, et al, "Nano-scaled Graphene Plates," U.S. patent application Ser. No. 10/274,473 (Oct. 21, 2002); now U.S. Pat. No. 7,071,258 (Jul. 4, 2006)]. A single-layer graphene is composed of carbon atoms forming a 2-D hexagonal lattice through strong in-plane covalent bonds. In a multi-layer graphene, several graphene planes are weakly bonded together through van der Waals forces in the thickness-direction. Since 2002, our research group has been working to develop processes for mass-producing both single-layer and multi-layer graphene and their composites, and to investigate the applications of graphene materials in many areas. Recently, we have demonstrated that graphene sheets can serve as a supporting substrate for an anode active material, which can be a thin film coated onto a graphene surface or fine powders (e.g. nanoparticles) bonded to a graphene surface [B. Z. Jang and A. Zhuma, "Nano Graphene Platelet-Based Composite Anode Compositions for Lithium Ion Batteries," U.S. patent application Ser. No. 11/982,672 (Nov. 5, 2007) now U.S. Pat. No. 7,745,047 (Jun. 29, 2010)]. Several other research groups have also reported a similar approach of combining graphene with an anode active material (e.g., $SnO_2$, $TiO_2$, $Mn_3O_4$, $Fe_2O_3$, and $Co_3O_4$), by taking advantages of graphene's electric conductivity.

We hypothesize that, although the Si particles in a graphene-silicon hybrid material can still expand and shrink during lithiation/delithiation (Li alloying/de-alloying during cell charge/discharge), the strong but flexible graphene sheets surrounding the Si nanoparticles are capable of cushioning the stress/strain to some extent. Meanwhile, the graphene sheets ensure good electric contacts between adjacent Si particles and between Si particles and a current collector. With an ultra-high length-to-thickness aspect ratio (up to 50,000) and low thickness (e.g. just one or a few atomic layers), a very small amount of graphene is sufficient to provide the electron-conducting network. Furthermore, graphene by itself could also be a good anode active material. Therefore, we believe that graphene-silicon composites are promising anode materials for lithium ion batteries.

However, graphene/silicon composite anode active materials are commonly made by simply mixing silicon nanoparticles with graphene or graphene oxide, and such an approach often led to only limited improvement in electrochemical performance. In contrast to graphene-metal oxide composite anode materials in which metal oxide can be readily deposited or grown on graphene sheet surfaces, the limited success in graphene-silicon composite might be due to the lack of a simple and efficient method capable of well controlling the structure and morphology of the resulting hybrid material that could deliver the aforementioned features and advantages.

Furthermore, from mass production and cost perspectives, current processes for producing nano Si powder have been time-consuming and energy-intensive, also typically requiring the use of high-vacuum, high-temperature, and/or high-pressure production equipment. The resulting Si nano powder products have been extremely expensive and this cost issue has severely impeded the full-scale commercialization of Si nano powder materials. Hence, there exists a strong need for a more cost-effective process for producing Si nano powder in large quantities.

More significantly, current processes for producing Si/graphene hybrid materials typically entail producing Si nano particles and graphene sheets separately and then combining the two components together. Such a simple-minded approach eliminates the possibility for graphene or graphene precursor to offer the beneficial effects on the kinetics and energetics of Si nano particle forming processes, and on the structure and morphology of the resulting hybrid materials. This is beyond and above the simple issues of the higher costs associated with the conventional processes. Of course, excessively high costs of current Si nano particles remain a critical issue. The present invention addresses all of these longstanding and highly challenging problems in the lithium-ion battery industry.

The past research and development efforts on silicon nano materials have been focused mostly on silicon nano particles, silicon nano wires, silicon thin films, and even silicon nano tubes. Common methods used for producing silicon nano powders include plasma-enhanced chemical vapor deposition (PECVD), laser-induced pyrolysis of $SiH_4$, and hot-wire synthesis methods. These techniques are typically very slow and require either ultra-high temperature or high power supply, and sometimes ultra-high vacuum, which lead to high fabrication costs.

For instance, U.S. Pat. No. 7,615,206 issued Nov. 10, 2009 to K. H. Sandhage and Z. H. Bao provides methods for the production of shaped nanoscale-to-microscale silicon through partially or completely converting a nanoscale-to-microscale silica template by using magnesium vapor. Magnesiothermic reduction of silica requires much lower temperatures (normally in the range of 600–800° C.) compared with the carbothermal reduction of silica (normally over 2000° C.) and thus has become a relatively popular technique used in pure metal production. Silicon is obtained by the following reaction: $2Mg+SiO_2 \rightarrow 2MgO+Si$. However, this process must be conducted under a high pressure condition and there is the danger of explosion not just during the reaction procedure (due to pressure vessel weakness), but also after the reaction is presumably completed when the reactor is opened (ultra-fast reaction of un-used Mg with air).

Furthermore, when using Mg vapor to chemically reduce silica, one tends to also form magnesium silicide and, hence, this process is not suitable for mass production. Using magnesium powder will add to cost of producing nano-sized silicon and the particle size of magnesium could dramatically influence the reduction results and purity, and thus is not conducive to mass production of nano Si.

Herein, we present a facile and cost-effective method of mass-producing silicon nano wires, silicon nanowire/graphene hybrid materials, and Si nanowire/exfoliated graphite flake hybrid materials. This method overcomes all the problems commonly associated with conventional methods of producing nano-scaled Si for lithium-ion battery anode applications.

SUMMARY OF THE INVENTION

The present invention provides a process for producing graphene-silicon nanowire hybrid material composition. This process comprises: (A) preparing a catalyst metal-coated mixture mass, which includes mixing exfoliated graphite flakes (having a thickness from 100 nm to 1 μm) or graphene sheets (having a thickness less than 10 nm) with micron or sub-micron scaled silicon particles (having a particle diameter from 0.2 μm to 20 μm) to form a mixture and depositing a catalytic metal (in the form of nano particles having a size from 0.5 nm to 100 nm (preferably less than 50 nm and more preferably less than 20 nm) or a coating having a thickness from 1 nm to 100 nm (preferably less than 50 nm and more preferably less than 20 nm) onto surfaces of the graphene sheets and/or surfaces of the silicon particles; and (B) exposing the catalyst metal-coated mixture mass to a high temperature environment (preferably from 300° C. to 2,000° C., more preferably from 400° C. to 1,500° C., and most preferably from 500° C. to 1,200° C.) for a period of time sufficient to enable a catalytic metal-catalyzed growth of multiple silicon nanowires using the silicon particles as a feed material to form the graphene-silicon nanowire hybrid material composition. These Si nanowires appear to have extruded out from the starting Si particles and emanate from surfaces of graphene sheets or exfoliated graphite flakes. The silicon nanowires produced in this manner have a diameter less than 100 nm and a length-to-diameter aspect ratio of at least 5 (more typically l/d=10-10,000 and most typically 100-1,000).

It may be noted that this high temperature range depends on the catalytic metal used. For instance, for Cu, Ni, and/or Fe, the range is preferably from 700° C. to 1,000° C. For catalysts containing noble metals, the reaction temperatures are preferably higher.

The graphene material (graphene sheets) may be selected from pristine graphene, graphene oxide, reduced graphene oxide, graphene fluoride, graphene bromide, graphene iodide, boron-doped graphene, nitrogen-doped graphene, chemically functionalized graphene, or a combination thereof. Preferably, the graphene material is selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

The starting micron or sub-micron scaled silicon particles can have a diameter from 0.2 μm to 50 μm, but preferably from 0.5 μm to 5 μm, and more preferably <3 μm. The Si particles refer to particles of pure (neat) Si having at least 99.9% by weight of Si element or a Si alloy or mixture having from 70% to 99.9% by weight of Si therein. Other non-Si elements can be oxygen, hydrogen, nitrogen, a metallic element (such as Ni, Co, Fe, Li, Cu, Ag, Au, Mn, Zn, Al, etc.), or a combination thereof. These non-Si elements can significantly alter the required Si nanowire formation temperatures, but the Si alloy or mixture remains capable of forming Si nanowires provided that the Si particles do not contain more than 2% of non-metallic elements and/or more than 30% of metallic elements.

The starting Si particles and starting graphene material (in a thin sheet form), referred to as primary particles, are mixed to produce secondary particles, which are each a mixture of graphene sheets, Si particles, and possibly other ingredients (e.g. conductive additive). In an embodiment, the graphene sheets and micron or sub-micron scaled silicon particles are mixed to form a mixture in a particulate form of multiple secondary particles having a size from 1 μm to 30 μm.

In one embodiment, the starting graphene sheets and micron or sub-micron scaled silicon particles are mixed to form a mixture prior to the step of depositing a catalytic metal on surfaces of graphene sheets and/or surfaces of silicon particles. This mixture is preferably prepared in a particulate form, characterized by having the two primary particles (graphene sheets or exfoliated graphite flakes and Si particles) combined to form secondary particles having a diameter from 1 to 100 μm, preferably from 2 to 50 μm, and more preferably from 5 to 20 μm. The graphene/Si mixture can optionally contain an amount (e.g. 1% to 30% by weight) of conductive additive for the mere purpose of enhancing the electrical or thermal conductivity of the resulting electrode. The conductive additive may be selected from natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof. This conductive additive is preferably not coated with a catalytic metal and is not involved in promoting the growth of Si nanowires.

The mixture or secondary particles preferably are porous, having a pore preferably from 2 nm to 1 μm, more preferably from 5 nm to 200 nm, and most preferably from 10 nm to 100 nm (prior to deposition of catalytic metal). These pores would allow for entry of the catalytic metal or its precursor in a liquid or vapor form. After catalytic metal deposition, the resulting metal-coated secondary particles preferably remain porous, having pore sizes from 2 nm to 200 nm. These pores would allow for space into which Si nanowires can grow. They would also allow for entry of liquid electrolyte when the resulting Si nanowire-graphene hybrid particles are used as an anode active material of a lithium-ion battery.

In an embodiment, the step of depositing a catalytic metal includes (a) dissolving or dispersing a catalytic metal precursor in a liquid to form a precursor solution, (b) bringing the precursor solution in contact with surfaces of the graphene sheets, exfoliated graphite flakes, and/or silicon particles, (c) removing the liquid component; and (d) chemically or thermally converting the catalytic metal precursor to the catalytic metal coating or metal nano particles. In one embodiment, the step (d) of chemically or thermally converting the catalytic metal precursor is conducted concurrently with the procedure (B) of exposing the catalyst metal-coated mixture mass to a high temperature environment.

The catalytic metal precursor may be a salt or organo-metal molecule of a transition metal selected from Cu, Ni, Co, Mn, Fe, Ti, Al, or a combination thereof. Preferably, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

In a preferred embodiment, the catalytic metal is selected from Cu, Ni, Co, Mn, Fe, Ti, Al, Ag, Au, Pt, Pd, or a combination thereof. The step of depositing a catalytic metal may be conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof. The step of mixing the silicon particles and graphene sheets is conducted by liquid solution mixing, homogenizer mixing, high shearing mixing, wet milling, air milling, or ball-milling.

In an alternative embodiment, the mixing of graphene sheets (or exfoliated graphite flakes) with micron or sub-micron scaled silicon particles is conducted after surfaces of the graphene sheets and/or the silicon particles are deposited with the catalytic metal. The mixing of graphene sheets with micron or sub-micron scaled silicon particles is conducted in such a manner that the resulting mixture is in a form of porous secondary particles having a diameter from 1 μm to 20 μm and having meso pores therein from 2 nm to 50 nm in size.

The procedure of exposing the catalyst metal-coated mixture mass to a high temperature environment is preferably conducted in a protective atmosphere of an inert gas, nitrogen gas, hydrogen gas, a mixture thereof, or in a vacuum.

It may be noted that the present process enables Si nanowires to grown from both original Si particle surfaces and graphene sheet surfaces. Typically, multiple graphene sheets and catalytic metals are present along with the produced Si nanowires. For certain applications, one may choose to use Si nanowires without graphene. Hence, in an embodiment, the process may further comprise a procedure of separating the graphene sheets from the silicon nanowires.

In one embodiment, the process may further comprise a procedure of removing the residual catalytic metal from the graphene-silicon nanowire hybrid material composition; for instance, via chemical etching or electrochemical etching.

The present invention also provides (a) a graphene-silicon nanowire hybrid material composition produced by the above-described process; (b) a battery electrode containing such a graphene-silicon nanowire hybrid material composition; and (c) a lithium battery (e.g. a lithium-ion battery or a lithium-ion sulfur battery) containing such a graphene-silicon nanowire hybrid material composition as an anode active material.

DETAILED DESCRIPTION OF PREFERRED EMBODIMENTS

Figure 2:
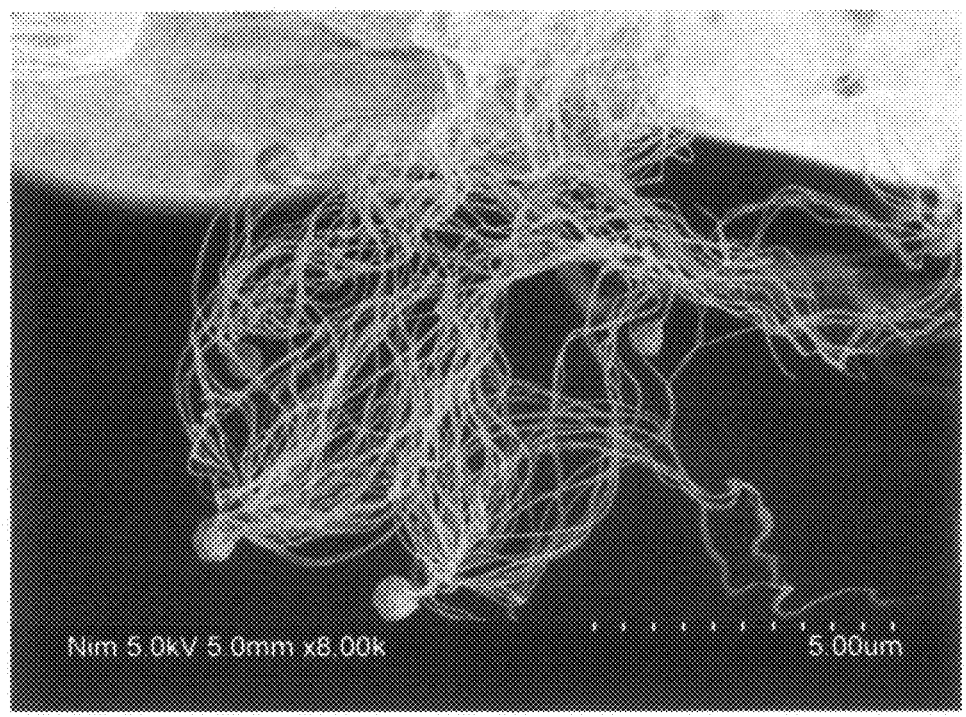
FIG. 2 SEM image of Si nanowires grown from Si micron particles without the presence of graphene sheets.
Figure 3A:
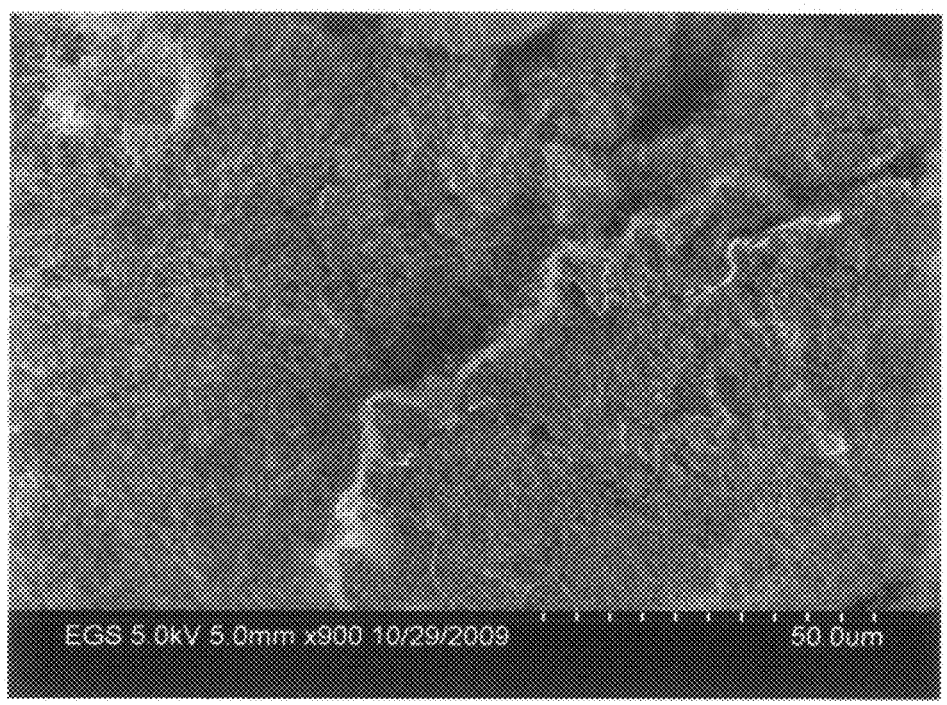
FIG. 3(A) SEM image of Si nanowires grown from Si micron particles supported by graphene sheets.
Figure 3B:
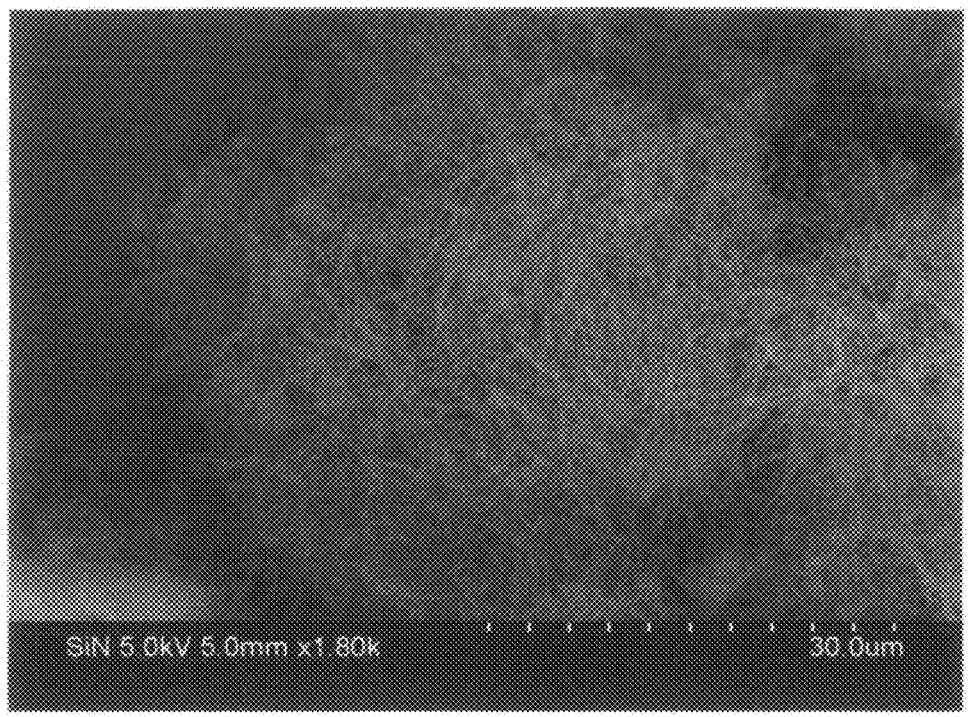
FIG. 3(B) SEM image at a higher magnification.

The present invention provides a process for initiating and growing Si nanowires from micron or sub-micron scaled silicon particles having a particle diameter from 0.2 µm to 20 µm. In other words, the starting material is micron or sub-micron scaled silicon particles, which are thermally and catalytically converted directly into nano-scaled, wire-shaped Si having a diameter or thickness less than 100 nm, more typically less than 50 nm and most typically less than 20 nm (often as small as 2-10 nm). Studies using scanning electron microscopy (SEM) indicate that tens or hundreds of nanowires can be grown or "extruded out" from a starting solid Si particle. As an example, FIG. 2 shows that hundreds of Si nanowires have been sprouted or emanated from just a few Si particles that were originally 3-5 µm in diameter. These Si nanowires have drawn the needed Si atoms from the few starting Si particles. By spitting out such a large number of nanowires, the original Si particles (without the help from graphene sheets) were reduced to approximately 0.6 µm in diameter. With the presence of graphene sheets, essentially all the micron or sub-micron Si particles are totally "eaten"; there is typically no residual Si particles left (e.g. FIGS. 3(A) and (B)).

There are several advantages associated with this process. For instance, there is no chemical reaction (such as converting $SiH_4$ into Si in a CVD process) and does not involve any undesirable chemical, such as silane, which is toxic. There is no danger of explosion, unlike the process of converting $SiO_2$ to Si using magnesium vapor. Other additional advantages will become more apparent later.

Figure 1A:
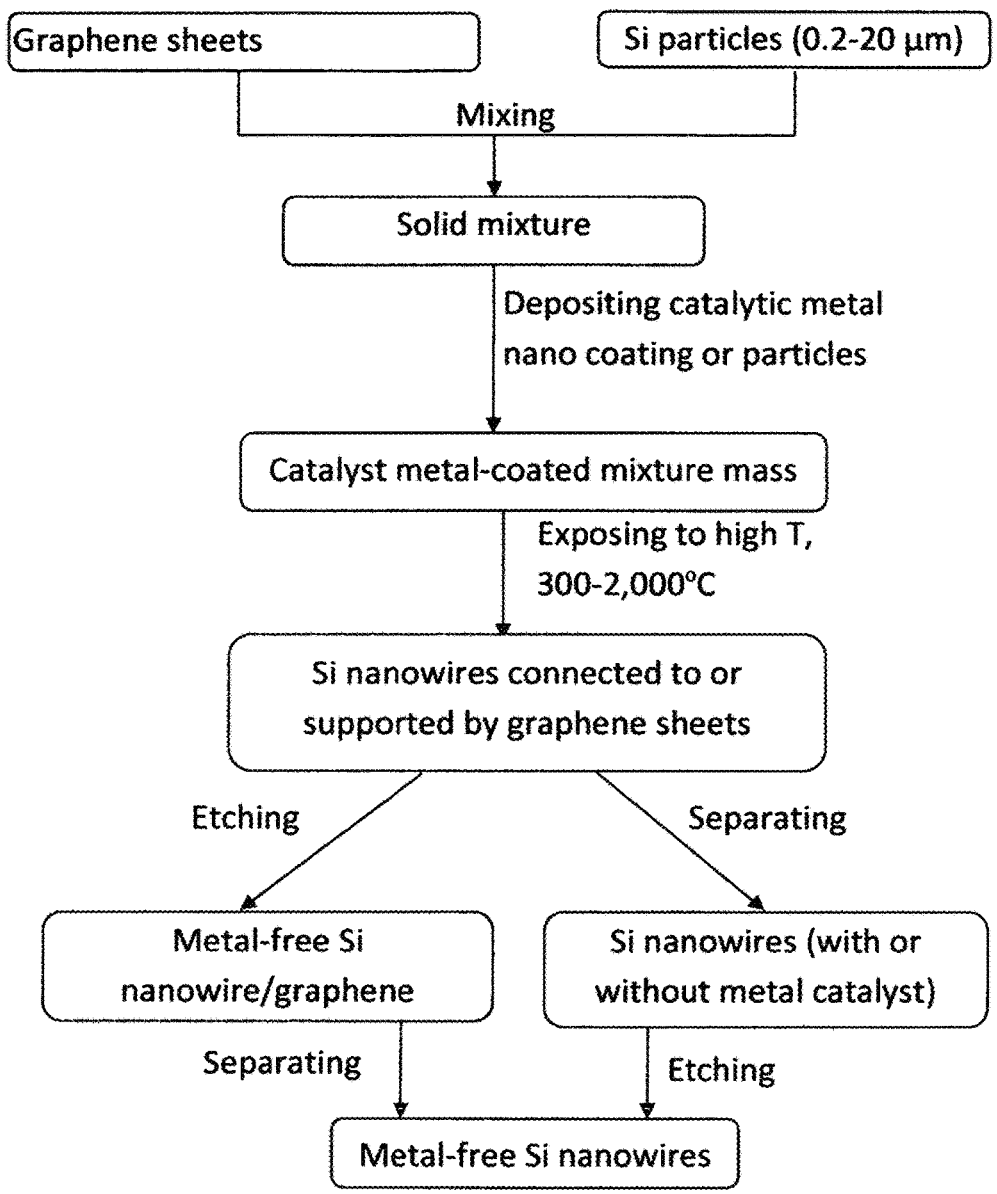
FIG. 1(A) A flow chart showing a preferred route to preparing Si nanowire/graphene hybrid material.
Figure 1B:
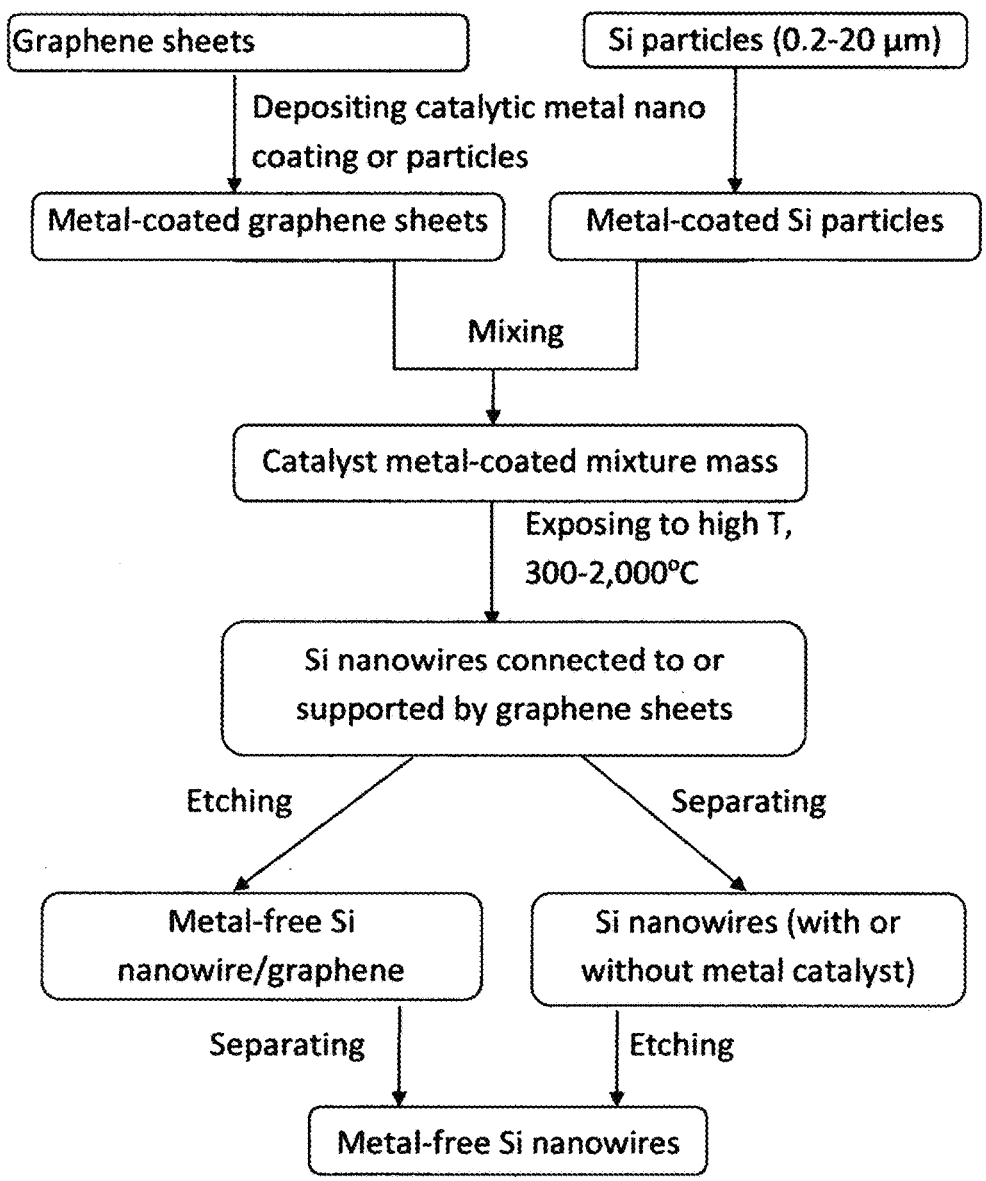
FIG. 1(B) A flow chart showing another preferred route to preparing Si nanowire/graphene hybrid material.

As illustrated in FIGS. 1(A) and 1(B), this process begins by preparing a catalyst metal-coated mixture mass (Procedure A), which includes (a) mixing exfoliated graphite flakes (having a thickness from 100 nm to 1 µm) or graphene sheets (having a thickness less than 10 nm) with micron or sub-micron scaled silicon particles to form a mixture and (b) depositing a catalytic metal onto surfaces of the graphene sheets and/or surfaces of the silicon particles. The step (a) of mixing and step (b) of metal deposition can occur sequentially (i.e. (a) after (b), or (b) after (a)), or concurrently. Preferably, the graphene sheets or exfoliated graphite flakes are position to have as many contact spots with Si particles as possible. This can be accomplished by wrapping Si particles with graphene sheets or exfoliated graphite flakes.

The catalytic metal is preferably in the form of a nano-scaled coating (having a thickness less than 100 nm, preferably less than 50 nm, more preferably less than 20 nm, and most preferably less than 10 nm) or nano-scaled particles (having a diameter less than 100 nm, preferably less than 50 nm, more preferably less than 20 nm, and most preferably less than 10 nm). Thinner metal coating or smaller particles of metal are more effective in producing a larger number of smaller Si nanowires, which are preferred features when it comes to using Si nanowires as an anode active material of a lithium-ion battery.

In Procedure B, the catalyst metal-coated mixture mass is then exposed to a high temperature environment (preferably from 300° C. to 2,000° C., more preferably from 400° C. to 1,500° C., and most preferably and typically from 500° C. to 1,200° C.) for a period of time sufficient to enable a catalytic metal-catalyzed growth of multiple silicon nanowires. These Si nanowires are emanated or extruded out from the silicon particles, which act as the source material for the growing Si nanowires to feed on. Additionally, even larger numbers of Si nanowires are emanated from surfaces of exfoliated graphite flakes or graphene sheets (FIG. 3(A)). This is most striking because there was no Si material pre-deposited on surfaces of graphene sheets or exfoliated graphite flakes. The resulting mass is a hybrid material composed of graphene sheets and silicon nanowires (plus residual metal nano particles). The silicon nanowires have a diameter from 1 nm to 100 nm (more typically 2-20 nm) and a length that is typically 1-1000 µm (more typically 10-100 µm); hence, a length-to-diameter aspect ratio more typically from 10 to 10,000 (most typically from 100 to 1,000).

It may be noted that this high temperature range depends on the catalytic metal used. For instance, for Cu, Ni, and/or Fe, the range is preferably from 700° C. to 1,000° C. For catalysts containing noble metals, the reaction temperatures are much higher, typically from 1,000° C. to 2,000° C.

The graphene material (graphene sheets) may be selected from pristine graphene, graphene oxide, reduced graphene oxide, graphene fluoride, graphene bromide, graphene iodide, boron-doped graphene, nitrogen-doped graphene, chemically functionalized graphene, or a combination thereof. Preferably, the graphene material is selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes. The preparation of graphene materials and exfoliated graphite will be described in details in later sections and several examples.

The starting silicon particles preferably have a diameter from 0.5 µm to 5 µm, more preferably <3 µm. The starting Si particles (preferably spherical in shape, but can be of any shape) and starting graphene material (in a thin sheet form) are referred to as primary particles, which are mixed to produce secondary particles, which are each a mixture of graphene sheets, Si particles, and possibly other ingredients (e.g. conductive additive). In an embodiment, the graphene sheets and micron or sub-micron scaled silicon particles are mixed to form a mixture in a particulate form of multiple secondary particles having a size from 1 µm to 30 µm, preferably from 3 µm to 10 µm.

In one embodiment, the starting graphene sheets (or exfoliated graphite flakes) and micron or sub-micron scaled silicon particles are mixed to form a mixture prior to the step of depositing a catalytic metal on surfaces of graphene sheets (or exfoliated graphite flakes) or surfaces of silicon particles. In an embodiment, the step of depositing a catalytic metal includes:
(a) dissolving or dispersing a catalytic metal precursor in a liquid to form a precursor solution; e.g. dissolving nickel nitrate, $Ni(NO_3)_2$, in water;
(b) bringing the precursor solution in contact with surfaces of the graphene sheets (or exfoliated graphite flakes)

and/or surfaces of silicon particles; e.g. immersing the Si particle-graphene sheet mixture (preferably in a secondary particulate form) into the Ni(NO$_3$)$_2$-water solution;

(c) removing the liquid component; e.g. vaporizing water of the Ni(NO$_3$)$_2$-water solution, allowing Ni(NO$_3$)$_2$ to coat on the surfaces of Si particles and graphene sheets (or exfoliated graphite flakes); and (d) chemically or thermally converting the catalytic metal precursor (e.g. Ni(NO$_3$)$_2$) to the catalytic metal coating or metal nano particles; e.g. by heating the Ni(NO$_3$)$_2$-coated mass at 450-650° C. in a hydrogen environment.

In one embodiment, the step (d) of chemically or thermally converting the catalytic metal precursor is conducted concurrently with the procedure (B) of exposing the catalyst metal-coated mixture mass to a high temperature environment.

The catalytic metal precursor may be a salt or organo-metal molecule of a transition metal selected from Cu, Ni, Co, Mn, Fe, Ti, Al, or a combination thereof. Preferably, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper carboxylate, nickel carboxylate, cobalt carboxylate, manganese carboxylate, iron carboxylate, titanium carboxylate, aluminum carboxylate, or a combination thereof. Different types of precursor require different temperatures and/or chemical reactants for conversion to the catalytic metal phase. Different catalytic metals enable Si nanowire growth at different temperatures.

In a preferred embodiment, the catalytic metal is selected from Cu, Ni, Co, Mn, Fe, Ti, Al, Ag, Au, Pt, Pd, or a combination thereof. The step of depositing a catalytic metal may be conducted by a procedure of physical vapor deposition (PVD), chemical vapor deposition (CVD), sputtering, plasma deposition, laser ablation, plasma spraying, ultrasonic spraying, printing, electrochemical deposition, electrode plating, electrodeless plating, chemical plating, or a combination thereof. The step of mixing the silicon particles and graphene sheets is conducted by liquid solution mixing, homogenizer mixing, high shearing mixing, wet milling, air milling, or ball-milling.

In an alternative embodiment, the mixing of graphene sheets with micron or sub-micron scaled silicon particles is conducted after surfaces of the graphene sheets and/or the silicon particles are deposited with the catalytic metal. This can be accomplished by using the above-described solution deposition procedure (i.e. dissolving nickel nitrate, copper acetate, etc. in a liquid, followed by liquid removal). Alternatively, ultra-thin coating or nano particles of a catalytic metal may be deposited on the surfaces of Si particles, graphene sheets, or exfoliated graphite flakes using sputtering, physical vapor deposition, chemical vapor deposition, laser ablation, etc.

The mixing of metal-coated graphene sheets (or exfoliated graphite flakes) with metal-coated micron or sub-micron scaled silicon particles is conducted in such a manner that the resulting mixture is in a form of porous secondary particles having a diameter from 1 μm to 20 μm and having meso pores therein from 2 nm to 50 nm in size.

The procedure of exposing the catalyst metal-coated mixture mass to a high temperature environment is preferably conducted in a protective atmosphere of an inert gas, nitrogen gas, hydrogen gas, a mixture thereof, or in a vacuum.

It may be noted that the present process enables Si nanowires to grow from both original Si particle surfaces and surfaces of graphene sheets or exfoliated graphite flakes. A highly unexpected observation is the notion that a huge number of Si nanowires appear to grow out of surfaces of graphene sheets or exfoliated graphite flakes as well. These Si nanowires appear to emanate from these sheet/flake surfaces everywhere, even though that there was no pre-deposited Si on these surfaces and there were limited initial contact points between graphene sheets and original Si particles (i.e. there was very limited amount of Si source on graphene surfaces). With the presence of graphene sheets or thin exfoliated graphite flakes, the number of Si nanowires is typically 1 or 2 orders of magnitude larger than that in the samples containing Si particles alone, without the presence of metal-coated graphene sheets or graphite flakes. Additionally, the resulting Si nanowires are significantly smaller in diameter, typically thinner than 20 nm, in contrast to the typically >20 nm (more typically >30 nm and most typically >50 nm) for those Si nanowires grown directly from original Si particles. Furthermore, metal-coated graphene sheets were found to be more effective than metal-coated exfoliated graphite flakes in emanating thin Si nanowires. These are highly desirable attributes considering that smaller Si nanowire diameters imply shorter diffusion paths for lithium ions and, hence, faster charge and discharge procedures for the lithium-ion batteries.

Typically, in the resulting hybrid material, multiple graphene sheets and catalytic metals are present along with the produced Si nanowires. For certain applications, one may choose to use Si nanowires without graphene. Hence, in an embodiment, the process may further comprise a procedure of separating the graphene sheets from the silicon nanowires.

In one embodiment, the process may further comprise a procedure of removing the residual catalytic metal from the graphene-silicon nanowire hybrid material composition; for instance, via chemical etching or electrochemical etching.

The following is a more detailed description of the procedures that can be used to produce exfoliated graphite flakes and various types of graphene sheets:

In a preferred embodiment, the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The electrode material may be selected from an exfoliated graphite material. The starting graphitic material for producing any one of the above graphene or exfoliated graphite materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

Figure 4A:
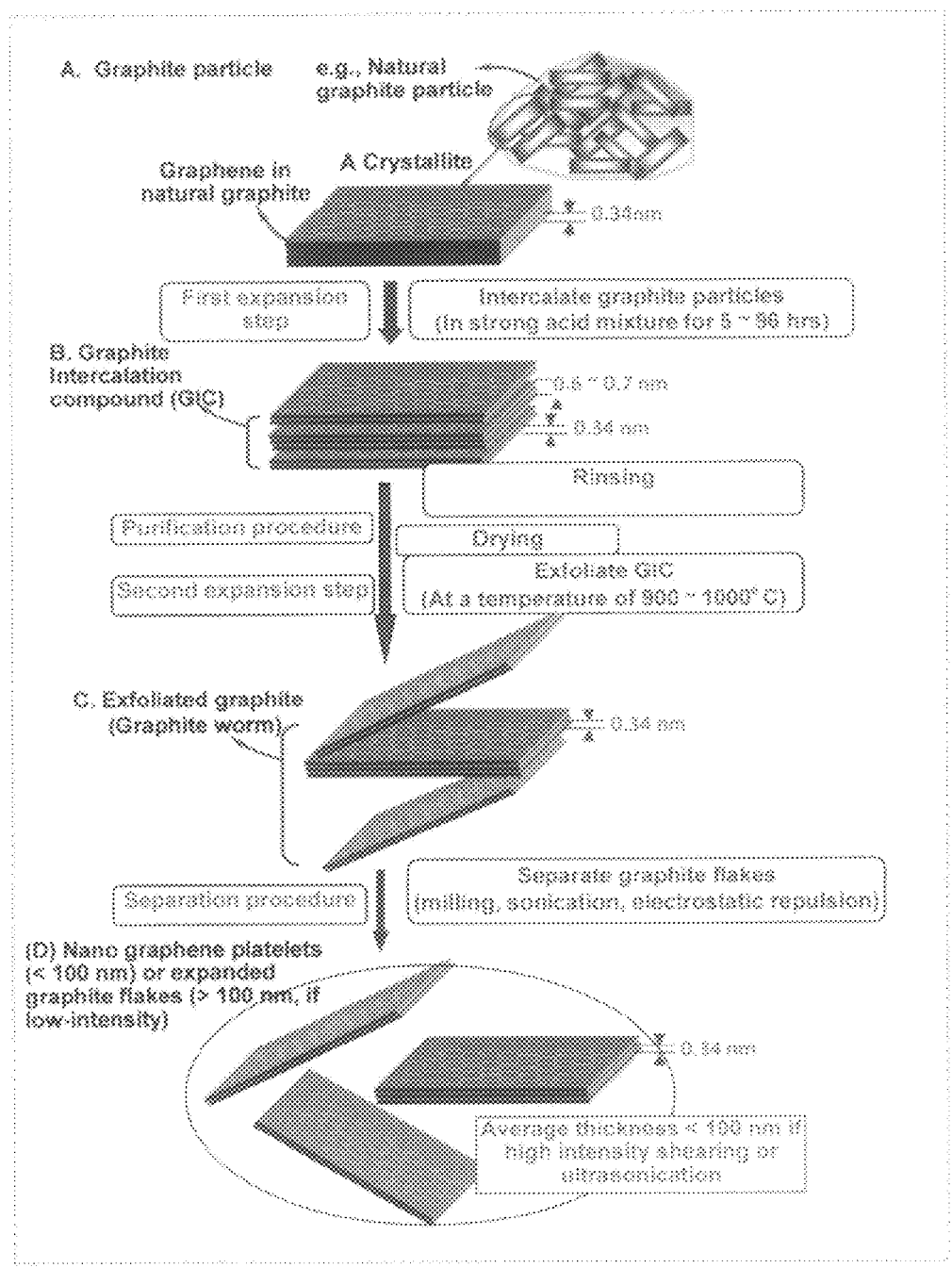
FIG. 4(A) Schematic of the commonly used procedures for producing exfoliated graphite worms and graphene sheets.
Figure 4:
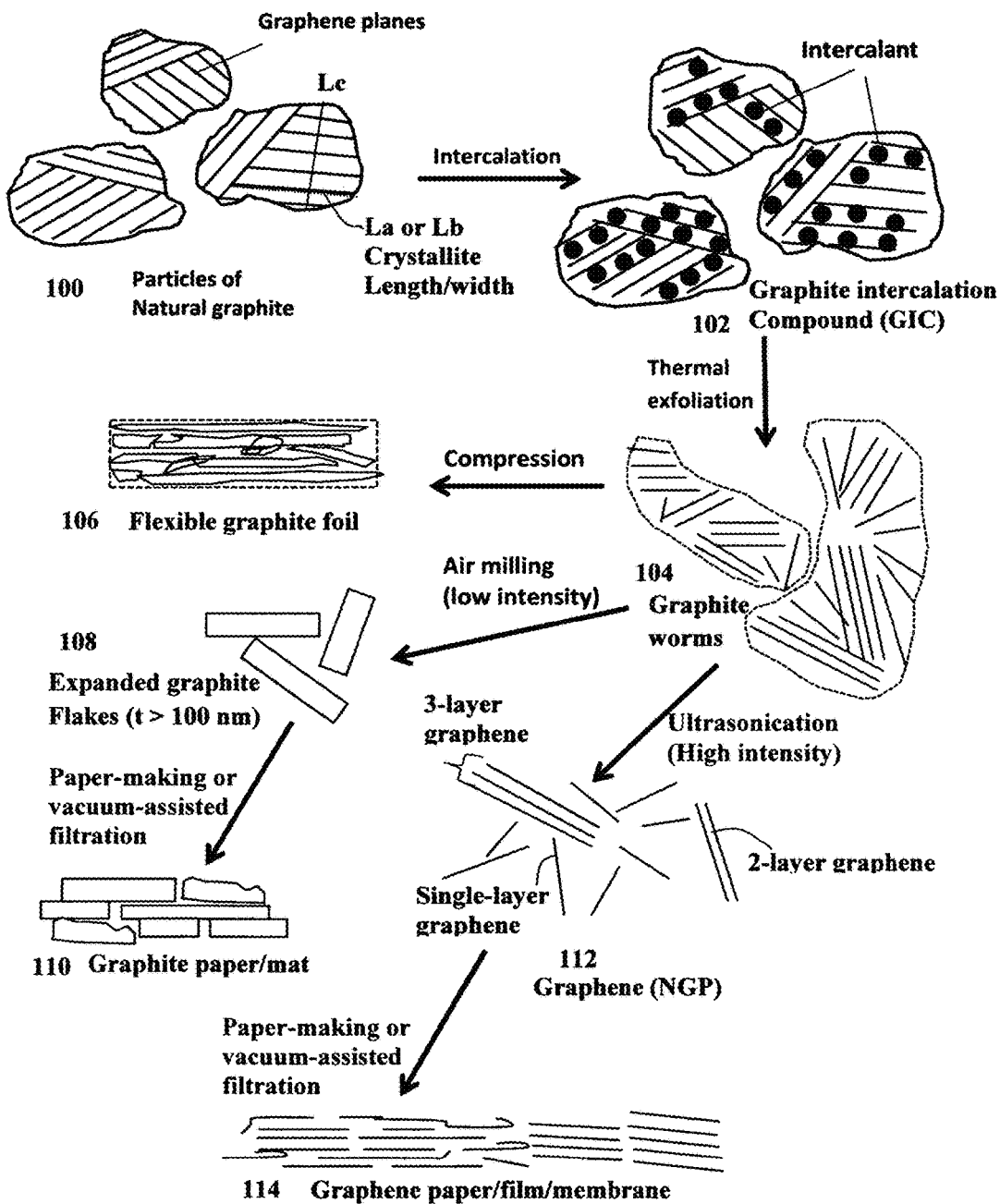
FIG. 4(B) Another schematic drawing to illustrate the process for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 4(A) and FIG. 4(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 4(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 4(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 4(B), different crystallites in a graphite particle are typically oriented in different directions and, hence, a particular property of a multi-crystallite graphite particle is the directional average value of all the constituent crystallites.

Figure 5A:
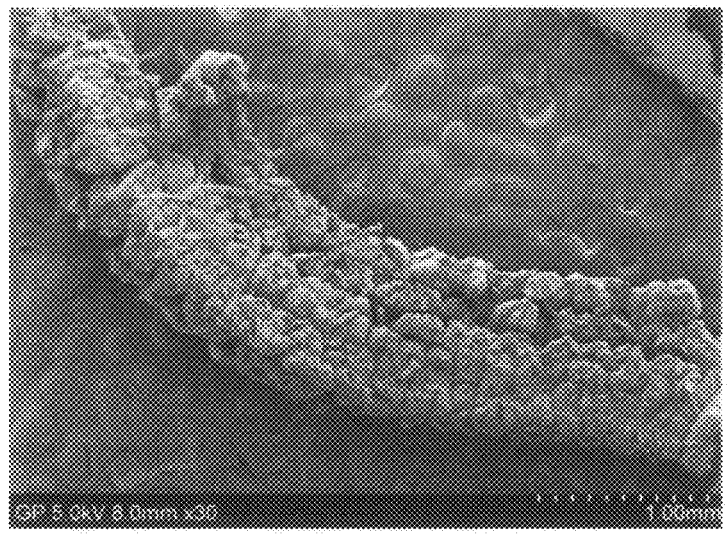
FIG. 5(A) SEM images of exfoliated graphite worms imaged at a low magnification.
Figure 5B:
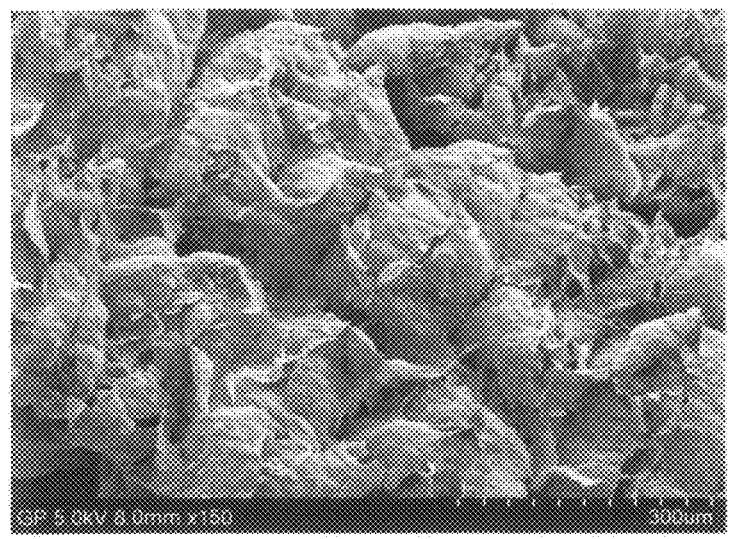
FIG. 5(B) same graphite worm as in (A), but taken at a higher magnification.
Figure 5C:
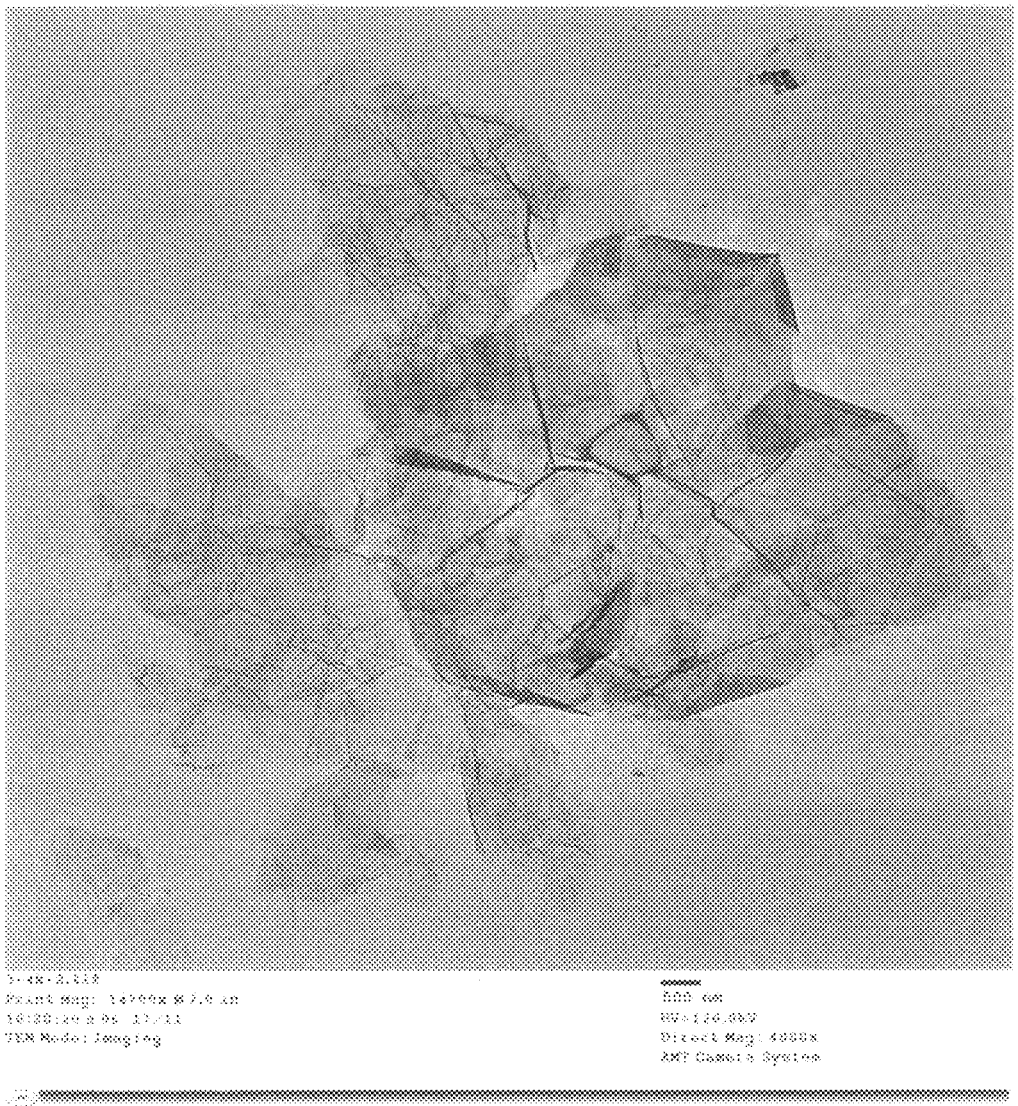
FIG. 5(C) TEM image of single-layer graphene sheets partially stacked together.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 4(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. Examples of exfoliated graphite worms (or, simply, graphite worms) are presented in FIGS. 5(A) and 5(B). These worms of graphite flakes can be subjected to a low-intensity mechanical shearing to produce flakes of exfoliated graphite, also sometimes referred to as expanded graphite flakes. High-intensity shearing of graphite worms tends to produce graphene sheets, also referred to as nano graphene platelets (NGPs).

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG . . . and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to a high-intensity mechanical shearing/separation treatment using a high-intensity air jet mill, high-intensity ball mill, or ultra-sonic device to produce separated nano graphene platelets (NGPs) with all the graphene platelets thinner than 100 nm, mostly thinner than 10 nm, and, in many cases, being single-layer graphene (also illustrated as 112 in FIG. 4(B)). An NGP is composed of a graphene sheet or a plurality of graphene sheets with each sheet being a two-dimensional, hexagonal plane of carbon atoms. Alternatively, with a low-intensity shearing, graphite worms tend to be separated into the so-called expanded graphite flakes (108 in FIG. 4(B)) having a thickness>100 nm.

These flakes, along with starting Si particles, can be formed into porous paper or mat 106 using a paper- or mat-making process, with or without a resin binder. This can be conducted before, during, or after catalytic metal deposition. In one preferred embodiment of the present invention, the porous web can be made by using a slurry molding or a flake spraying technique. These methods can be carried out in the following ways:

As a wet process, aqueous slurry is prepared which comprises a mixture of graphene sheets or expanded graphite flakes and a desired amount of micron or sub-micron Si particles. A water solution of metal salt may also be added to the slurry. The slurry is then directed to impinge upon a sieve or screen, allowing water to permeate through, leaving behind sheets/flakes/particles. The slurry may also be sprayed dried to form secondary particles containing graphene sheets (or exfoliated graphite flakes), Si particles, and catalytic metal salt (if present) coated on surfaces of Si and graphene sheets (or exfoliated graphite flakes).

As a dry process, the directed sheet/flake spray-up process utilizes an air-assisted flake/particle spraying gun, which conveys flakes/sheets/particles to a molding tool (e.g., a perforated metal screen shaped identical or similar to the part to be molded). Air goes through perforations, but the solid components stay on the molding tool surface.

Each of these routes can be implemented as a continuous process. For instance, the process begins with pulling a substrate (porous sheet) from a roller. The moving substrate receives a stream of slurry (as described in the above-described slurry molding route) from above the substrate. Water sieves through the porous substrate with all other ingredients (a mixture of graphene sheets or graphite flakes, optional conductive fillers, and Si particles) remaining on the surface of the substrate being moved forward to go through a compaction stage by a pair of compaction rollers. Heat may be supplied to the mixture before, during, and after compaction to help cure the thermoset binder (if present) for retaining the shape of the resulting web or mat. The web or mat, with all ingredients held in place by the thermoset binder, may be stored first (e.g., wrapped around a roller). Similar procedures may be followed for the case where the mixture is delivered to the surface of a moving substrate by compressed air, like in a directed fiber/binder spraying process. Air will permeate through the porous substrate with other solid ingredients trapped on the surface of the substrate, which are conveyed forward. The subsequent operations are similar than those involved in the slurry molding route.

Other processes that can be used to produce mixtures of Si particles and graphene sheets or exfoliated graphite flakes include, for instance, spray drying of slurry containing the mixture, wet milling, ball milling, impact milling, tumbling drying, freeze-drying, etc.

In a desired embodiment, the process of producing a graphene-silicon nanowire hybrid material composition further comprises a procedure of incorporating a carbonaceous or graphitic material into the graphene-silicon nanowire hybrid material composition as a conductive additive. This carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

For instance, the graphene-silicon nanowire hybrid material composition, in a porous membrane form, may be impregnated or infiltrated with carbon under a chemical vapor deposition (CVD) or chemical vapor infiltration condition. This may be accomplished by introducing methane or ethylene gas into the system at a temperature of 500-1,500° C. Alternatively, one may impregnate the porous graphene-silicon nanowire hybrid material composition with a resin or pitch, which is then heated to carbonize the resin or pitch at a temperature of 350-1,500° C. Alternatively, one may simply mix the particulates of graphene-silicon nanowire hybrid material composition with particles of a carbon or graphite material to form a multi-component mixture.

The following examples are provided for the purpose of illustrating the best mode of practicing the present invention and should not be construed as limiting the scope of the instant invention.

Example 1

Preparation of Graphene Oxide (GO) and Reduced GO Nano Sheets from Natural Graphite Powder and their Porous Paper/Mats Containing Si Particles and/or Metal Salt Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation procedure, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt. % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt. % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. A desired amount of Si particles of several different size ranges (with an average size, $D_{50}$, of 0.85, 3.2, and 12.3 µm, respectively) was then added to the GO-water suspension to form a slurry sample.

Chemical reduction of as-obtained GO to yield RGO was conducted by using the following method: The procedure began with placing 10 mL of a 0.1 wt. % GO aqueous solution in a boiling flask of 50 mL. Then, 10 µL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction. A desired amount of Si particles of several different size ranges (with an average size, $D_{50}$, of 0.85, 3.2, and 12.3 µm, respectively) was then added to the suspensions (RGO in surfactant water) to form a slurry sample.

These GO-Si and RGO-Si slurry samples were then filtered through a vacuum-assisted membrane filtration apparatus to obtain porous layers (membranes) of GO-Si and RGO-Si paper or mat. These mat/paper membranes were then impregnated with a solution of nickel nitrate, iron nitrate, and copper acetate in water. Water was subsequently removed from the impregnated membranes and the dried membranes were then exposed to a reducing atmosphere of $H_2$ and Ar gas following a desired temperature profile, typically from room temperature to a reduction temperature of approximately 300-700° C. (for reduction of nickel nitrate to Ni nano coating, for instance). The temperature was continued to rise to a final temperature of 700-1,200° C. and the system was allowed to cool down naturally. Si nanowires were found to emanate from both existing Si particles and graphene sheets (both GO and RGO sheets, separately).

Example 2

Preparation of Discrete Functionalized GO Sheets from Graphite Fibers and Porous Membranes of Chemically Functionalized GO Chopped graphite fibers with an average diameter of 12 µm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After a drying treatment at 100° C. overnight, the resulting graphite intercalation compound (GIC) or graphite oxide fiber was re-dispersed in water-alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. Ammonia water was added to one pot of the resulting suspension, which was ultrasonicated for another hour to produce $NH_2$-functionalized graphene oxide (f-GO). The GO sheets and functionalized GO sheets were separately diluted to a weight fraction of 5% and a desired amount of Si particles was added to the suspensions. On a separate basis, a metal salt solution of cobalt carboxylate or manganese carboxylate in water was prepared. The metal salt solution was then added to the GO/Si or f-GO/Si suspensions to form mixture slurries. The resulting slurries were allowed to stay in the container without any mechanical disturbance for 2 days.

The resulting slurries containing GO/Si/metal salt or f-GO/Si/metal salt were then cast onto a glass surface using a doctor's blade to exert shear stresses, inducing GO sheet orientations. The resulting coating films of GO/Si/metal salt or f-GO/Si/metal salt, after removal of liquid, have a thickness that can be varied from approximately 10 to 500 µm. The films were then subjected to heat treatments that involve an initial thermal reduction temperature of 450° C. for 2 hours (in a mixture of $H_2$ and $N_2$), followed by heat-treating at a second temperature of 800-1,500° C. (in Ar gas atmosphere) for different specimens to obtain various porous films containing Si nanowires embedded in a matrix of reduced graphene oxide sheets. Surprisingly, this heat treatment concurrently accomplishes several things: reduction of GO to RGO, reduction of metal salt to metal nano coating, formation of meso-scaled (2-100 nm) and some micron- or submicron-scaled pores (100 nm-10 µm) due to evolution of volatile reaction product species (e.g. $CO_2$, $H_2O$, etc.), and catalytic growth of Si nanowires from Si particles and graphene surfaces.

Example 3

Preparation of Single-Layer Graphene Sheets and Porous Graphene Mats from Meso-Carbon Micro-Beads (MCMBs)

Meso-carbon micro-beads (MCMBs) were supplied from China Steel Chemical Co., Kaohsiung, Taiwan. This material has a density of about 2.24 g/cm³ with a median particle size of about 16 µm. In one example, MCMB (10 grams)

were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to fully exfoliate and separate GO sheets. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

The GO suspension was then diluted to approximately 0.5% by weight in a container. A desired amount of cobalt sulfate and, separately, iron sulfate, was dissolved in water to form two separate metal salt solutions. Each metal salt solution was then added into a GO suspension, followed by addition of Si particles to form a slurry sample. The slurries were allowed to age in the container without mechanical disturbance. The slurries were then cast onto a glass surface using a doctor's blade to exert shear stresses, inducing GO sheet orientations. The resulting GO/Si/metal salt films, after removal of liquid, have a thickness that can be varied from approximately 10 to 500 µm. The resulting GO/Si/metal salt compact was then subjected to heat treatments that typically involve an initial thermal reduction temperature of 300-800° C. for 1-5 hours, followed by heat-treating at a second temperature of 800-1,500° C. Again, this heat treatment concurrently accomplishes four things: reduction of GO to RGO, reduction of metal salt to metal nano coating, formation of pores (2 nm-10 µm) due to evolution of volatile reaction product species (e.g. $CO_2$, $H_2O$, etc.), and catalytic growth of Si nanowires from Si particles and graphene sheets.

As a baseline experiment, we have also prepared a slurry containing Si particles in water with a corresponding metal salt dissolved therein (cobalt sulfate or iron sulfate). This was followed by casting and heat-treating under comparable conditions for comparison purposes.

In each sample, a huge number of Si nanowires were observed to grow out of surfaces of graphene sheets. These Si nanowires appear to emanate from everywhere on these sheet surfaces. With the presence of graphene sheets, the number of Si nanowires is typically 1 or 2 orders of magnitude larger than that in the samples containing Si particles alone, without the presence of graphene sheets. Additionally, the resulting Si nanowires emanated from graphene surfaces are significantly smaller in diameter, typically thinner than 20 nm, in contrast to the typically >20 nm for those Si nanowires grown directly from original Si particles.

Example 4

Preparation of Pristine Graphene Sheets/Platelets (0% Oxygen) and the Effect of Pristine Graphene Sheets Pristine graphene sheets (non-oxidized and oxygen-free) were produced by using the direct ultrasonication or liquid-phase production process. In a typical procedure, five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free.

Several approaches were followed to produce Si nanowire-graphene hybrid materials from pristine graphene sheets and micron-scaled Si particles:

(1) Mixing un-coated Si particles and un-coated graphene sheets in a metal salt-water solution to make a slurry, which was then spray-dried to form secondary mixture particulates (3-15 µm in diameter), while concurrently enabling deposition of metal salt onto surfaces of both Si particles and graphene sheets;

(2) Mixing metal salt-coated Si particles and un-coated graphene sheets (having a specific surface area of 430-885 $m^2/g$) to form secondary mixture particulates; and (3) Mixing un-coated Si particles and metal salt-coated graphene sheets (having a specific surface area of 350-790 $m^2/g$) to form secondary mixture particulates.

In the latter two approaches, either Si particles or graphene sheets were dispersed in a metal salt-water solution to form a suspension. Subsequently, water was removed to allow for deposition of metal salt onto particle or sheet surfaces. The metal salt was then thermally converted to metal in the form of nano metal coating or metal nano particles deposited on Si particle or graphene sheet surfaces. For comparison purposes, deposition of metal catalyst (e.g. Ni, Ag, and Ni/Ag mixture) onto either Si particles or various graphene sheets (pristine graphene, RGO, and GO) was also carried out by using sputtering.

By using SEM to examine starting Si particles and graphene sheets as well as the resulting Si nanowires and Si nanowire-graphene hybrid particulates, we made some important discoveries, summarized below:

(A) Hybrid particulates containing both catalyst metal-coated Si particles and metal-coated graphene sheets are dramatically more effective in promoting growth of Si nanowires than those particulates that contain catalyst metal-coated Si particles and un-coated graphene sheets and those un-coated Si particles and metal-coated graphene sheets. Under comparable conditions, the former produces a dramatically larger number of Si nanowires (by 1 to 2 orders of magnitude), and the Si nanowires are significantly smaller in diameter (typically from 2 nm to approximately 20 nm), in contrast to typically 40-100 nm of Si nanowires produced by the latter two types of particulates.

(B) The number of Si nanowires that can be emanated from a metal-coated Si particle per unit volume of Si particle in a particulate containing un-coated graphene sheets and coated Si particles appears to be controlled by the total surface area of the catalytic metal deposited on the Si particle per unit volume of Si. Un-coated graphene sheets do not seem to contribute in growing Si nanowires. Larger Si particles lead to smaller number of Si nanowires per unit volume of original Si.

(C) In hybrid particulates that contain un-coated Si particles and metal-coated graphene sheets, Si nanowires appear to nucleate mainly from those interface areas where metal-coated graphene sheets contact a Si particle.

Figure 6:
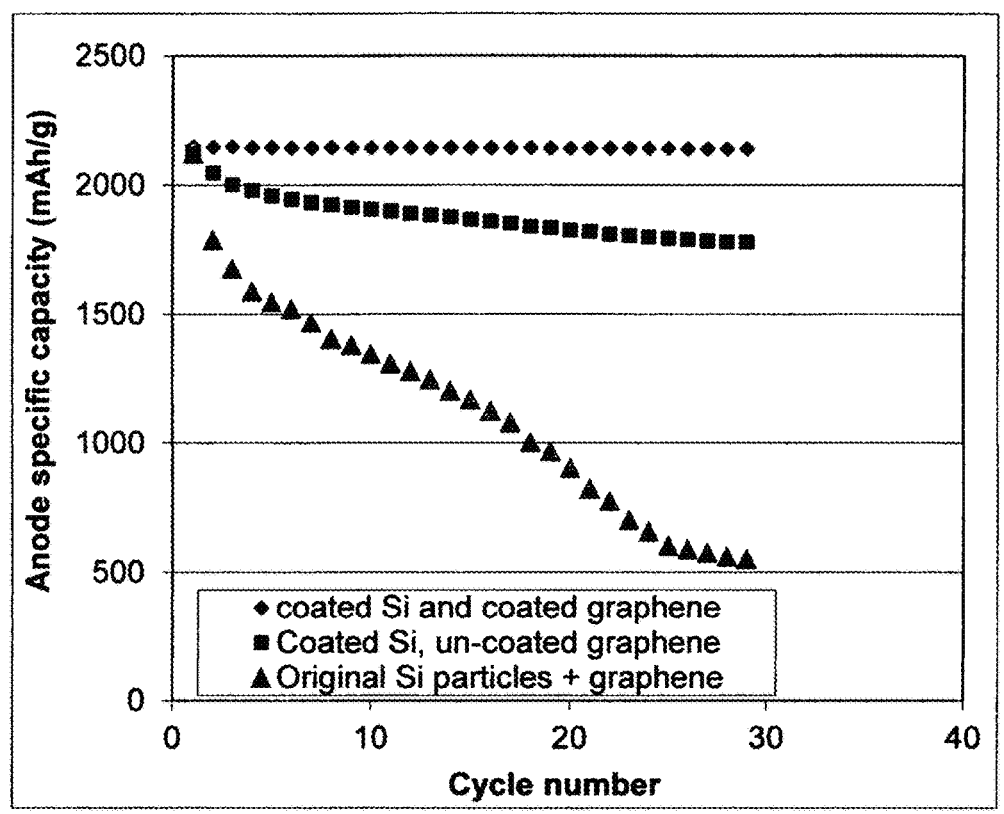
FIG. 6 Cycling test results of three lithium-ion cells: first cell containing original Si particles and graphene sheets (no Si nanowires) as the anode active material, second cell containing Si nanowires grown from Ni metal-coated Si particles and un-coated graphene sheets, and third cell containing Si nanowires emanated from both Ni-coated Si particles and Ni-coated graphene sheets.

(D) We have further observed that a larger number of smaller-diameter Si nanowires, given the same Si amount, enables a battery anode active material featuring the presently invented hybrid material to deliver a higher specific capacity at both low and high charge/discharge rates, a higher energy density (e.g. FIG. 7), higher power density (e.g. FIG. 7), and longer battery cycle life (e.g. FIG. 6).

Example 5

Preparation of Graphene Fluoride (GF) Nano Sheets and Porous Graphene/Si Structures Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, or isoamyl alcohol) and subjected to an ultrasound treatment (280 W) for 30 min, leading to the formation of homogeneous yellowish dispersions. Five minutes of sonication was enough to obtain a relatively homogenous dispersion of few-layer graphene fluoride, but longer sonication times ensured the production of mostly single-layer graphene fluoride sheets. Some of these suspension samples were subjected to vacuum oven drying to recover separated graphene fluoride sheets.

These graphene fluoride (GF) sheets were then deposited with Ni and Ti metal, respectively, using sputtering. The resulting mass of metal-coated GF still maintains a specific surface area of 220-550 $m^2/g$. Subsequently, Si particles were also deposited with Ni or Ti and then blended with Ni- or Ti-coated graphene fluoride sheets to form secondary particulates.

Example 6

Preparation of Nitrogenataed Graphene Nano Sheets and Porous Graphene Structures Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenataed graphene sheets remain dispersible in water.

Si particles and a metal salt (nickel nitrate or silver nitrate) were dispersed/dissolved in the nitrogenataed graphene-water suspension to form a slurry. We have investigated Si particles that contain 0-20% non-Si elements, such as Li, Ni, and Fe. Subsequently, metal salt-coated hybrid particulates were obtained by spray-drying the slurry. The hybrid particulates were gradually heated in a hydrogen-argon gas mixture from room temperature to 1,000° C. (for Ni-assisted growth of Si nanowires) and 1,750° C. (for Ni/Ag-assisted growth of Si nanowires). The amount of non-Si elements in Si particles was found to significantly affect the required Si nanowire growth temperature, but not the morphology and dimensions of the resulting Si nanowires.

Example 7

Exfoliated Graphite Worms from Natural Graphite

Natural graphite, nominally sized at 45 μm, provided by Asbury Carbons (405 Old Main St., Asbury, N.J. 08802, USA) was milled to reduce the size to approximately 14 μm. The chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite (20 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite was quickly placed in a tube furnace preheated to 1,000° C. and allowed to stay inside a quartz tube for approximately 40 seconds to obtain exfoliated graphite worms.

Some of the graphite worms were then mixed with Si particles and the resulting mixture was exposed to metal cloud in a sputtering chamber. The metal-coated mixture was roll-pressed to obtain samples of re-compressed exfoliated graphite having a range of physical densities (e.g. 0.3 to 1.2 $g/cm^3$).

Some of the graphite worms were subjected to low-intensity sonication to produce separated (isolated) expanded graphite flakes. These expanded graphite flakes, after blended with Si particles and metal salt in water solution, were then cast into layers of porous membrane.

The Si-exfoliated graphite mixtures (both types of membrane) were gradually heated in a hydrogen-argon gas mixture from room temperature to 500° C., maintained at 500° C. for 2 hours, and then raised to 1,000° C. (for Ni-assisted growth of Si nanowires) and 1,750° C. (for Ni/Ag-assisted growth of Si nanowires), respectively.

Example 8

Exfoliated Graphite Worms from Various Synthetic Graphite Particles or Fibers

Additional exfoliated graphite worms were prepared according to the same procedure described in Example 7, but the starting graphite materials were graphite fiber (Amoco P-100 graphitized carbon fiber), graphitic carbon nano-fiber (Pyrograph-III from Applied Science, Inc., Cedarville, Ohio), spheroidal graphite (HuaDong Graphite, QinDao, China), and meso-carbon micro-beads (MCMBs) (China Steel Chemical Co., Taiwan), respectively. These four types of laminar graphite materials were intercalated and exfoliated under similar conditions as used for Example 1 for different periods of time, from 24 hours to 96 hours.

Some of the graphite worms were then mixed with Si particles and the resulting mixture was exposed to metal cloud in a sputtering chamber. The metal-coated mixture was roll-pressed to obtain samples of re-compressed exfoliated graphite having a range of physical densities (e.g. 0.3 to 1.2 g/cm$^3$). Some of the graphite worms were subjected to low-intensity sonication to produce separated (isolated) expanded graphite flakes. These expanded graphite flakes, after blended with Si particles and metal salt in water solution, were then cast into layers of porous membrane. The Si-exfoliated graphite mixtures were gradually heated in a hydrogen-argon gas mixture from room temperature to 500° C., maintained at 500° C. for 2 hours, and then raised to 1,000° C. (for Cu-assisted growth of Si nanowires).

Example 9

Exfoliated Graphite Worms from Natural Graphite Using Hummers Method

Additional graphite intercalation compound (GIC) was prepared by intercalation and oxidation of natural graphite flakes (original size of 200 mesh, from Huadong Graphite Co., Pingdu, China, milled to approximately 15 μm) with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately three hours at 30° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The resulting GIC was exposed to a temperature of 1,050° C. for 35 seconds in a quartz tube filled with nitrogen gas to obtain worms of exfoliated graphite flakes.

Some of the graphite worms were then mixed with Si particles and the resulting mixture was exposed to metal cloud in a sputtering chamber. The metal-coated mixture was roll-pressed to obtain samples of re-compressed exfoliated graphite having a range of physical densities (e.g. 0.3 to 1.2 g/cm$^3$). Some of the graphite worms were subjected to low-intensity sonication to produce separated (isolated) expanded graphite flakes. These expanded graphite flakes, after blended with Si particles and metal salt in water solution, were then cast into layers of porous membrane. The Si-exfoliated graphite mixtures (both types of membrane) were gradually heated in a hydrogen-argon gas mixture from room temperature to 500° C., maintained at 600° C. for 2 hours, and then raised to 1,000° C. (for Fe-assisted growth of Si nanowires).

Example 10

Removal of Graphene from the Si Nanowire/Graphene Hybrid Materials

A certain amount of the Si nanowire/graphene hybrid materials was put into a muffle furnace and calcined at 600° C.~800° C. for 2 hours under an air purging condition to remove the carbon content from the hybrid material, yielding yellow-colored silicon nanowire powders.

Example 11

Lithium-Ion Batteries Featuring Si Nanowire/Graphene or Si Nanowire/Exfoliated Graphite Flake Hybrid as an Anode Active Material For electrochemical testing, several types of anodes and cathodes were prepared. For instance, a layer-type of anode was prepared by simply roll-press the porous membranes against a sheet of Cu foil (as an anode current collector). For instance, these porous membranes are those prepared in Examples 1-3, and some samples of Examples 7 and 8.

Alternatively, for those hybrid materials produced in a secondary particulate form (e.g. those prepared in Examples 4 and 5), the working electrodes were prepared by mixing 85 wt. % active material (Si nanowire-graphene or Si nanowire-exfoliated graphite flake hybrid particulates), 7 wt. % acetylene black (Super-P), and 8 wt. % polyvinylidene fluoride (PVDF, 5 wt. % solid content) binder dissolved in N-methyl-2-pyrrolidinoe (NMP). After coating the slurries on Cu foil, the electrodes were dried at 120° C. in vacuum for 2 h to remove the solvent before pressing.

Then, the electrodes were cut into a disk (ϕ=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M LiPF$_6$ electrolyte solution dissolved in a mixture of ethylene carbonate (EC) and diethyl carbonate (DEC) (EC-DEC, 1:1 v/v). Various anode material compositions were evaluated, including those containing Si nanowires only (no graphene sheets present), Si nanowires grown from Si particles with or without the help from metal-coated graphene sheets or exfoliated graphite flakes. The cell assembly was performed in an argon-filled glove-box. The CV measurements were carried out using a CH-6 electrochemical workstation at a scanning rate of 1 mV/s. The electrochemical performance of graphene-Si nanowire particulates was also evaluated by galvanostatic charge/discharge cycling at a current density of 50-1,000 mA/g, using a LAND electrochemical workstation. Full-cell pouch configurations using lithium iron phosphate and lithium cobalt oxide cathodes were also prepared and tested.

Shown in FIG. 6 are charge/discharge cycling test results of three lithium-ion cells in terms of the anode specific capacity plotted as a function of the cycle number. The first battery cell contains conventional particulates of original Si particles (average diameter=3.5 μm) and graphene sheets (but no Si nanowires) as the anode active material. The second cell contains particulates of Si nanowires (diameter of 60-90 nm, grown from Ni metal-coated Si particles) and un-coated graphene sheets as the anode active material. The anode of the third cell contains particulates of Si nanowires (diameter of 5-20 nm) emanated from both Ni-coated Si particles and Ni-coated graphene sheets.

These results demonstrate that the particulates of Si nanowires emanated from both Ni-coated Si particles and Ni-coated graphene sheets provide the most stable cycling behavior for the lithium-ion cell. The particulates of graphene sheets and Si nanowires (grown from Ni metal-coated Si particles alone; not from un-coated graphene sheets) are less effective in providing the lithium-ion cell with a stable charge/discharge cycling response. However, this response is much better than what could be achieved by an anode based on the original micron-scaled Si particles. The latter suffers from rapid capacity decay as charges and discharges are repeated. The differences are quite dramatic, which are unexpected.

Figure 7:
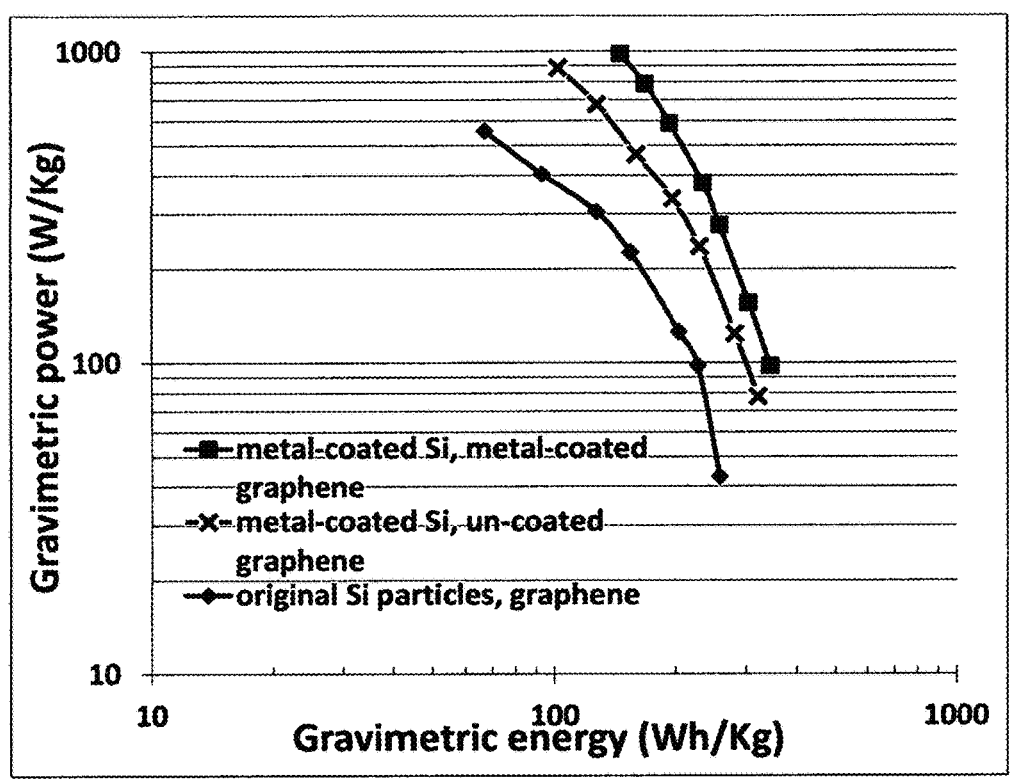
FIG. 7 Ragone plots (power density vs. energy density) of three lithium-ion cells: first cell containing original Si particles and graphene sheets (no Si nanowires) as the anode active material, second cell containing Si nanowires grown from Ni metal-coated Si particles and un-coated graphene sheets, and third cell containing Si nanowires emanated from both Ni-coated Si particles and Ni-coated graphene sheets.

FIG. 7 shows representative Ragone plots of three lithium-ion cells: first cell containing original Si particles and graphene sheets (no Si nanowires) as the anode active material, second cell containing Si nanowires grown from Ni metal-coated Si particles and un-coated graphene sheets, and third cell containing Si nanowires emanated from both Ni-coated Si particles and Ni-coated graphene sheets. The cell featuring an anode active material containing a massive amount of small-diameter Si nanowires emanated from both metal-coated Si particles and metal-coated graphene sheets exhibits both highest energy density and highest power density. The cell energy density of 345 Wh/kg is significantly higher than the typically 150-220 Wh/kg of prior art lithium-ion batteries. The power density of 983 W/kg is also much higher than the typically 300-500 W/kg. These are surprising and highly useful results.

Figure 8:
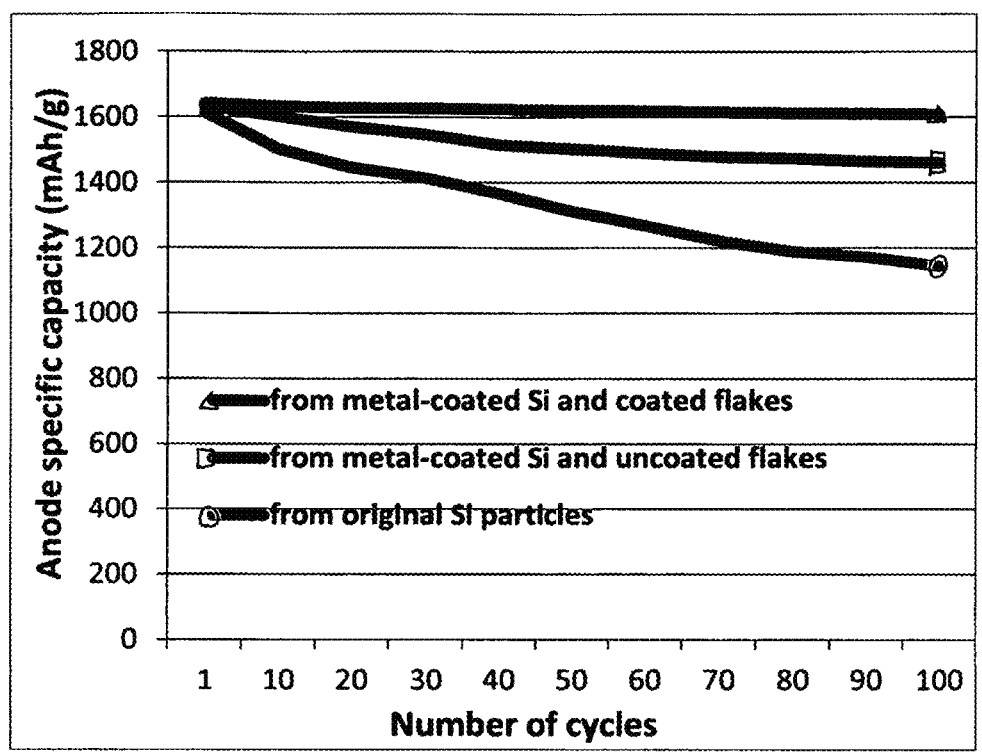
FIG. 8 Cycling test results of three lithium-ion cells: first cell containing original Si particles and exfoliated graphite flakes (no Si nanowires) as the anode active material, second cell containing Si nanowires grown from Ni metal-coated Si particles and un-coated exfoliated graphite flakes, and third cell containing Si nanowires emanated from both Ni-coated Si particles and Ni-coated exfoliated graphite flakes.

FIG. 8 shows the cycling test results of three lithium-ion cells: first cell containing original Si particles and exfoliated graphite flakes (no Si nanowires) as the anode active material, second cell containing Si nanowires grown from Ni metal-coated Si particles and un-coated exfoliated graphite flakes, and third cell containing Si nanowires emanated from both Ni-coated Si particles and Ni-coated exfoliated graphite flakes. These results demonstrate that the particulates of Si nanowires emanated from both Ni-coated Si particles and Ni-coated exfoliated graphite flakes provide the most stable cycling behavior for the lithium-ion cell. However, in comparison with ultra-thin graphene sheets (single-layer or few-layer graphene), exfoliated graphite flakes are less effective in promoting the growth of Si nanowires, leading to lower energy density and power density of lithium-ion cells.

We have conducted an extensive and in-depth study on the preparation of Si nanowires and a new class of nano materials called graphene/Si nanowire hybrid particulates directly from micron- or submicron-scaled Si particles. The following is a summary of some of the more significant observations or conclusions:

(1) A facile and cost-effective method of mass-producing silicon nanowires and graphene-silicon nanowire hybrid particulates has been developed. The Si nanowire-graphene hybrid materials provide the best performance in terms of maintaining a high capacity for a long cycle life as compared to all the anode active material for lithium-ion batteries.

(2) The resulting Si nanowires have a diameter typically in the range of 2 nm-100 nm (more often in the range of 5-20 nm, and most often 10-20 nm). These are highly desired particle size ranges for use as an anode active material, imparting a lithium-ion battery with an exceptionally high specific capacity and a stable and long battery life. As compared to the anode containing exfoliated graphite flakes and Si nanowires in the diameter range of 50-100 nm (grown from original Si particles, not from exfoliated graphite flakes) and the anode containing exfoliated graphite flakes and original Si particles (3.2 µm in diameter), the anode featuring exfoliated graphite flakes and Si nanowires of 10-20 nm provide the best ability to maintain the design capacity. For instance, given the same 100 battery charge-discharge cycles, the battery featuring Si nanowires 10-20 nm in diameter experiences a 2% capacity decay, the 20-50 nm Si nanowire-based battery suffers a 10.5% capacity decay, and the original Si particle-based battery suffers a 29% capacity decay.

(3) We have further observed that the presence of graphene sheets or exfoliated graphite flakes during the Si nanowire production process has significantly reduced the diameters of the final Si nanowires, hence imparting a better rate capability of battery due to reduced lithium ion diffusion paths.

(4) To achieve the goals of a high Si nanowire production yield, small nanowire diameter, high specific capacity of a battery anode, and more stable battery cycling performance, we have surprisingly found that pristine graphene is the best choice and graphene oxide (GO) the worst promoter. The following summarizes the order of preference: pristine graphene>boron-doped graphene>nitrogen-doped graphene>amine-functionalized graphene>graphene fluoride>graphene chloride>graphene bromide>graphene iodide>reduced graphene oxide (RGO)>graphene oxide (GO). In general, graphene sheets (1-10 nm in thickness) are more effective than exfoliated graphite flakes (>100 nm in flake thickness). It appears that the specific surface area of the metal-coated graphene sheets or metal-coated exfoliated graphite flakes is a critical factor. In general, the higher the specific surface area, the most effective in promoting growth of Si nanowires of ultra-small diameters.

(5) Si has been considered a highly promising high-capacity anode active material, but the major issues (such as high cost, poor conductivity, and volume expansion/shrinkage-induced pulverization) have prevented the commercialization of Si-based anode active materials for lithium-ion battery industry. The presently invented method has solved all the longstanding problems commonly associated with conventional methods of producing nano-scaled Si.

We claim:

1. A process for producing a graphene-silicon nanowire hybrid material composition, said process comprising:
(A) preparing a catalyst metal-coated mixture mass, which includes mixing exfoliated graphite flakes, having a flake thickness from 100 nm to 1 µm, or graphene sheets, having a thickness from 0.34 nm to 100 nm, with micron or sub-micron scaled silicon particles, having a particle diameter from 0.2 µm to 20 µm, to form a mixture and depositing a catalytic metal, in the form of nano particles having a size from 0.5 nm to 100 nm or a coating having a thickness from 1 nm to 100 nm, onto surfaces of said exfoliated graphite flakes or graphene sheets and/or surfaces of said silicon particles, wherein said Si particles contain pure Si having at least 99.9% by weight of Si element or a Si alloy or mixture having from 70% to 99.9% by weight of Si therein; and
(B) exposing said catalyst metal-coated mixture mass to a high temperature environment, from 300° C. to 2,000° C., to enable a catalytic metal-catalyzed growth of multiple silicon nanowires from said silicon particles as a feed material to form said graphene-silicon nanowire hybrid material composition; wherein said silicon nanowires have a diameter less than 100 nm and a length-to-diameter aspect ratio of at least 5.

2. The process of claim 1, wherein said graphene sheets are selected from pristine graphene, graphene oxide, reduced graphene oxide, graphene fluoride, graphene bromide, graphene iodide, boron-doped graphene, nitrogen-doped graphene, chemically functionalized graphene, or a combination thereof.

3. The process of claim 1, wherein said graphene sheets are selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

4. The process of claim 1, wherein said silicon particles have a diameter from 0.5 µm to 5 µm.

5. The process of claim 1, wherein said graphene sheets or exfoliated graphite flakes and said micron or sub-micron scaled silicon particles are mixed to form a mixture in a particulate form of multiple secondary particles having a size from 1 µm to 30 µm.

6. The process of claim 1, wherein said graphene sheets or exfoliated graphite flakes and said micron or sub-micron scaled silicon particles are mixed to form a mixture having pores with a pore size from 2 nm to 1 µm, prior to said step of depositing a catalytic metal on surfaces of said graphene sheets or exfoliated graphite flakes or surfaces of said silicon particles.

7. The process of claim 1, wherein said graphene sheets or exfoliated graphite flakes and said micron or sub-micron scaled silicon particles are mixed to form a mixture and silicon particles are wrapped around by graphene sheets or exfoliated graphite flakes.

8. The process of claim 1, wherein said graphene sheets or exfoliated graphite flakes and said micron or sub-micron scaled silicon particles are mixed to form a mixture and an optional conductive additive is added to this mixture to increase the conductivity of the mixture, wherein the conductive additive is selected from natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

9. The process of claim 1, wherein said step of depositing a catalytic metal includes (a) dissolving or dispersing a catalytic metal precursor in a liquid to form a precursor solution, (b) bringing said precursor solution in contact with surfaces of said graphene sheets or exfoliated graphite flakes and/or surfaces of said silicon particles, (c) removing said liquid; and (d) chemically or thermally converting said catalytic metal precursor to said catalytic metal coating or nano particles.

10. The process of claim 9, wherein said step (d) of chemically or thermally converting said catalytic metal precursor is conducted concurrently with the procedure (B) of exposing said catalyst metal-coated mixture mass to a high temperature environment.

11. The process of claim 9, wherein said catalytic metal precursor is a salt or organo-metal molecule of a transition metal selected from Cu, Ni, Co, Mn, Fe, Ti, Al, or a combination thereof.

12. The process of claim 9, wherein said catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

13. The process of claim 1, wherein said catalytic metal is selected from Cu, Ni, Co, Mn, Fe, Ti, Al, Ag, Au, Pt, Pd, or a combination thereof.

14. The process of claim 1, wherein said step of depositing a catalytic metal is conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof.

15. The process of claim 1, wherein said step of mixing the silicon particles and graphene sheets is conducted by liquid solution mixing, homogenizer mixing, high shearing mixing, wet milling, air milling, or ball-milling.

16. The process of claim 1, wherein said mixing of graphene sheets with micron or sub-micron scaled silicon particles is conducted after surfaces of said graphene sheets and/or said silicon particles are deposited with said catalytic metal.

17. The process of claim 1, wherein said mixing of graphene sheets with micron or sub-micron scaled silicon particles is conducted in such a manner that the resulting mixture is in a form of porous secondary particles having a diameter from 1 µm to 20 µm and having meso pores therein from 2 nm to 50 nm in size.

18. The process of claim 1, wherein said procedure of exposing said catalyst metal-coated mixture mass to a high temperature environment is conducted in a protective atmosphere of an inert gas, nitrogen gas, hydrogen gas, a mixture thereof, or in a vacuum.

19. The process of claim 1, further comprising a procedure of separating said graphene sheets from said silicon nanowires by a calcination procedure.

20. The process of claim 1, further comprising a procedure of removing said catalytic metal from said graphene-silicon nanowire hybrid material composition by chemical or electrochemical etching.

21. The process of claim 1, further comprising a procedure of removing said catalytic metal from said graphene-silicon nanowire hybrid material composition using chemical etching or electrochemical etching.

22. The process of claim 1, further comprising a procedure of incorporating a carbonaceous or graphitic material into said graphene-silicon nanowire hybrid material composition as a conductive additive during or after said composition is made, wherein said carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

23. A graphene-silicon nanowire hybrid material composition produced by the process of claim 1, wherein said silicon nanowires are emanated from surfaces of said graphene sheets or exfoliated graphite flakes.

24. A battery electrode containing a graphene-silicon nanowire hybrid material composition produced by the process of claim 1, wherein said silicon nanowires are emanated from surfaces of said graphene sheets or exfoliated graphite flakes.

25. A lithium battery containing graphene-silicon nanowire hybrid material composition produced by the process of claim 1 as an anode active material, wherein said silicon nanowires are emanated from surfaces of said graphene sheets or exfoliated graphite flakes.

\* \* \* \* \*